INVENTOR
BY PERRY A. SEAY
B. F. Spencer
ATTORNEY

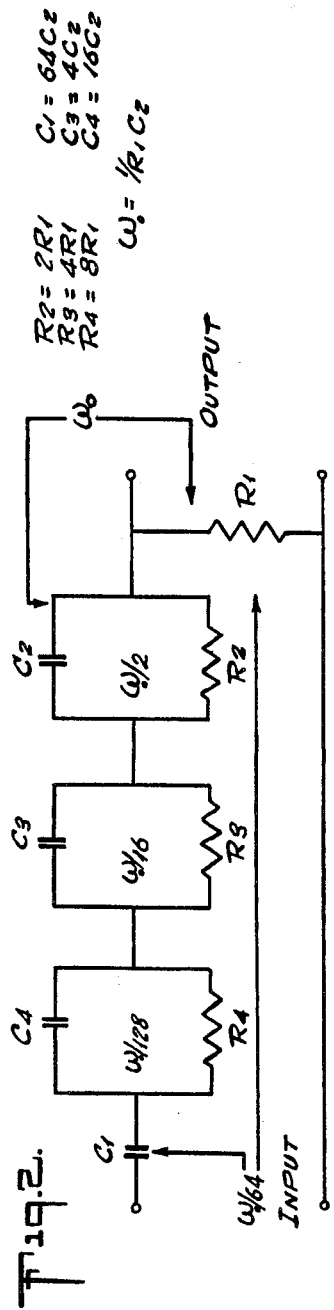
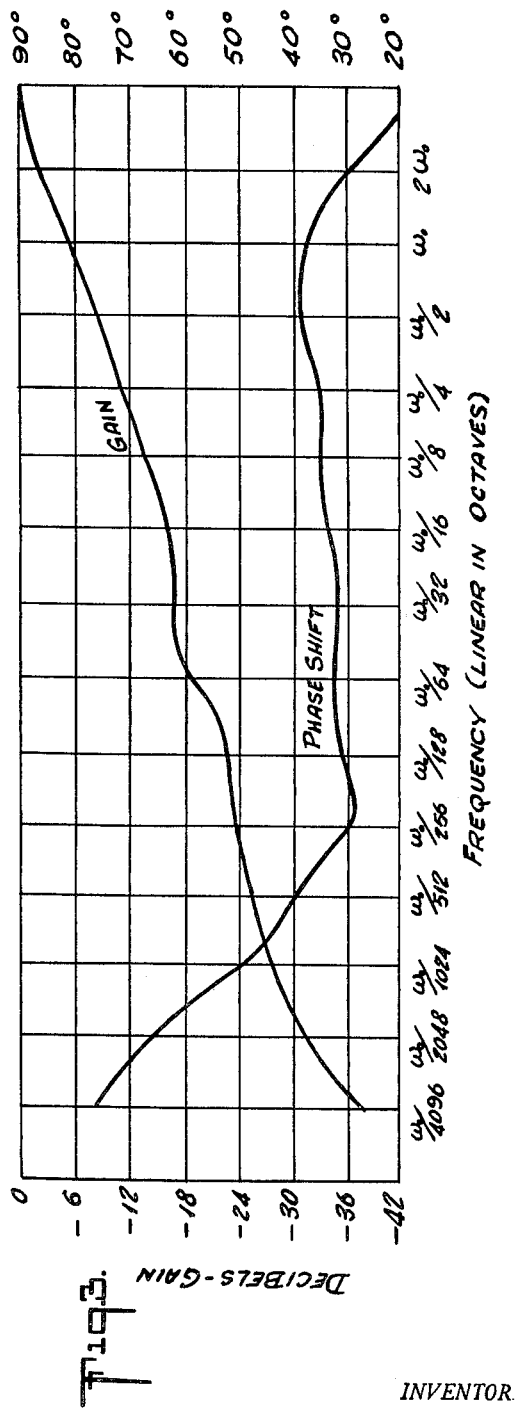

INVENTOR
BY PERRY A. SEAY
ATTORNEY

United States Patent Office 3,210,649
Patented Oct. 5, 1965

3,210,649
ADJUSTABLE IMPEDANCE CIRCUITS EMPLOY-
ING EXPONENTIALLY VARIABLE ELEMENTS
Perry A. Seay, Huntington, N.Y., assignor, by mesne assignments, to Dynamics Corporation of America, New York, N.Y., a corporation of New York
Original application Nov. 23, 1954, Ser. No. 470,711, now Patent No. 2,986,696, dated May 30, 1961. Divided and this application Dec. 9, 1960, Ser. No. 74,961
4 Claims. (Cl. 323—74)

This application is a division of application Serial No. 470,711, filed November 23, 1954, now Patent 2,986,696, and entitled "Method and Apparatus for Analyzing Phase Shifting Networks."

This invention relates to adjustable impedance elements useful for analyzing the operation of electrical networks.

Phase shifting networks are employed for a variety of purposes in electronic and electro-mechanical apparatus in order to attain certain desired modes of operation. Such a network functions to advance or retard the phase of one frequency relative to another and the magnitude of such advance or retardation varies with frequency as well as the amplitude of the resultant signal. While the design of phase shifting networks and particularly resistance-capacitance networks is well known, it is necessary in most cases to experimentally test the response of the network over the frequency range in which it is to function. This involves a relatively laborious and time consuming procedure requiring suitable wide-band test oscillators and measuring equipment. When making high frequency measurements, stray capacities are usually encountered and elaborate precaution must be taken to maintain them at a minimum in order to insure reasonably accurate results. Similarly at frequencies under 20 cycles per second the problem of generating pure sine waves and accurately measuring them presents substantial difficulties not easily overcome.

Accordingly an improved method and apparatus for designing and checking the operation of phase shifting networks over a predetermined frequency band wherein the need for wide band oscillators is eliminated along with the attendant difficulties encountered at both the high and low portions of the frequency band is described in the above identified application Serial No. 470,711, now Patent 2,986,696. To this end means are provided for utilizing a single frequency and modifying certain constants of the network to produce the same phase and amplitude variations that would be experienced by changing the frequency of the input signal by an equivalent amount. This has the added advantage of enabling the measurements to be performed at a convenient frequency and thus greatly simplifying the entire procedure. Moreover, errors in calculations can be readily detected, corrected and experimentally checked, thus eliminating the laborious task of rechecking all of the computations and then experimentally verifying them again.

It is a principal object of the present invention to provide adjustable impedance elements forming part of an electrical network for analyzing the operation of the electrical network over a wide frequency range by varying the values of the adjustable impedance elements while keeping the frequency of input energy supplied to the electrical network constant.

The foregoing and other objects are attained by providing a plurality of impedance elements that are adapted to be connected to form at least part of an electrical network whose operation is desired to be analyzed over a wide frequency range. The values of the impedance elements are adjustable separately in accordance with a logarithmic curve. Means are provided for adjusting said values simultaneously. As a simultaneous adjustment of values is made, the operation of the network with input energy of a constant frequency simulates the operation that would occur if the values of the impedance elements remained fixed and the frequency of the input energy were varied.

The above and other objects and advantages will become more apparent from the following description and accompanying drawings forming part of this application.

In the drawings:

FIG. 2 is an enlarged view of an illustrative filter of FIG. 1 including certain design information;

FIG. 3 is a graph showing the relationship of frequency, phase shift and gain of the network or filter of FIGS. 1 and 2 measured by the apparatus illustrated in FIG. 1;

As pointed out above, this invention provides means for experimentally analyzing networks embodying combinations of resistance with capacity and inductance elements to determine their behaviour in terms of phase shift and amplitude over a predetermined frequency range. While normal network computations may be checked in this way, more expeditious graphical methods may be used since the results can be obtained quickly and suitable changes made to attain the desired ends. Moreover, a whole family of curves can be produced quite easily to determine whether the best choice of network constants has been made to meet specific requirements.

More specifically, the invention utilizes the principle of varying elements of the network in lieu of varying the operating frequency and thereby eliminate the need for expensive oscillators as well as the problems entailed at the very high and very low frequencies. Changing the resistance values for instance in an R-C network by multiplying them by a constant K, has been found to produce the same phase and amplitude variations that would be obtained by changing the frequency of the input signal by the same factor.

Figure 1:
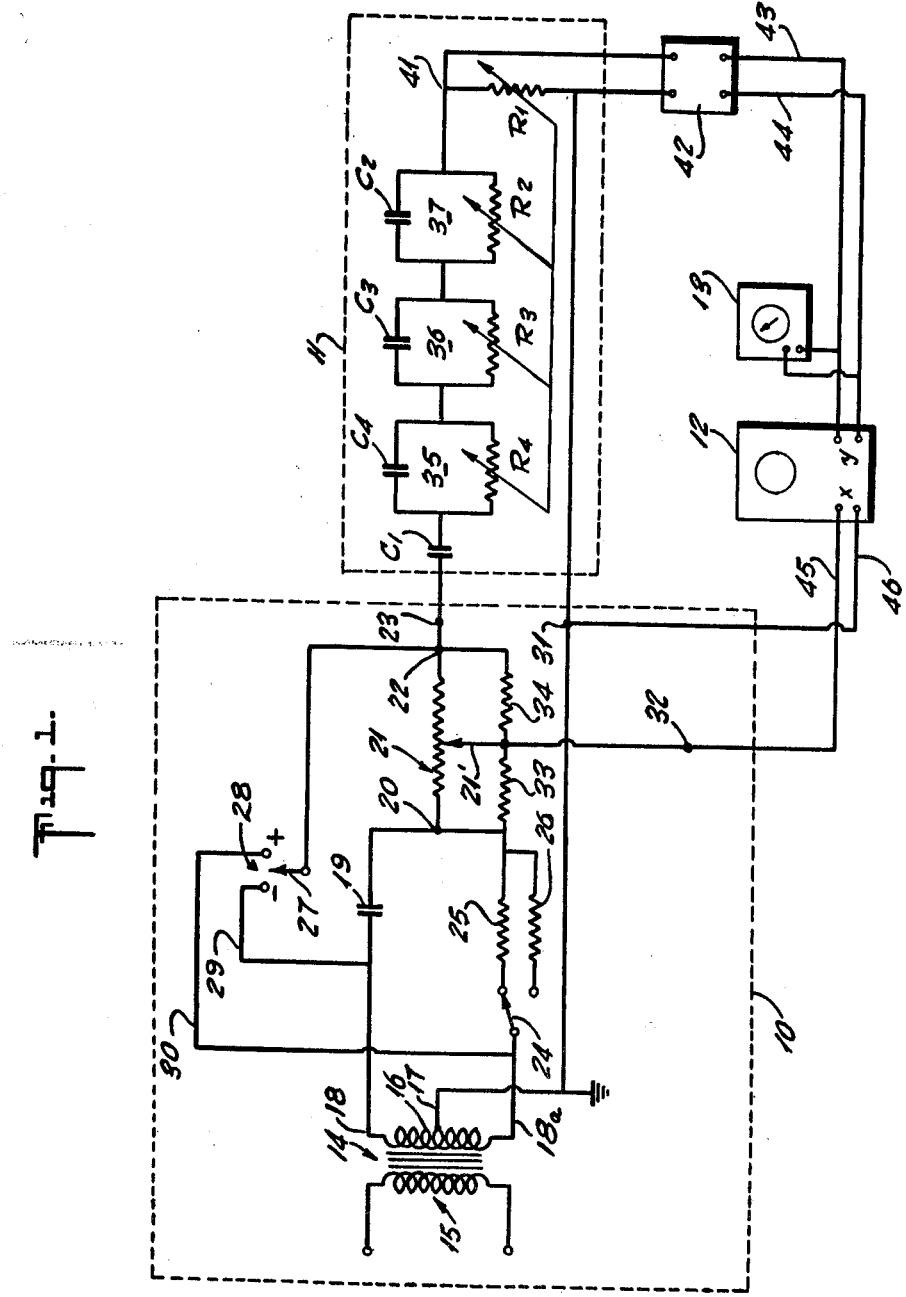
FIG. 1 is a circuit diagram of a phase shifter and an R-C phase shifting network utilizing the present invention.

Referring now to the drawings and more specifically to FIG. 1 thereof, there is shown a phase shifter 10 and an adjustable R-C network 11 coupled with the phase shifter and suitable testing or measuring equipment such as an oscilloscope 12 and a vacuum tube voltmeter 13 connected to both the phase shifter and the R-C network. The phase shifter 10 is preferably designed to operate at a suitable power frequency such as 60 cycles per second or 400 cycles per second and is provided with a power transformer 14 having a primary winding 15 for connection to the source of power. In this particular circuit the secondary 16 of the transformer 14 develops 12.6 volts and is provided with a center tap 17 so that the voltage on each side of the tap is 6.3 volts. While this particular transformer has been used because it is a generally available component for heating the filaments of vacuum tubes, any other suitable transformer may be employed that will meet the requirements of a given situation.

The upper terminal 18 of the secondary 16 is connected through a condenser 19 to one end terminal 20 of a potentiometer 21. The other end terminal 22 of the potentiometer is connected to an output terminal 23 of the phase shifter. The lower terminal 18a of the transformer secondary 16 is connected to a movable contactor of a two position switch 24. In one position of the switch 24, the end terminal 18a of the transformer secondary is connected through a resistor 25 to the end terminal 20 of the potentiometer 21 and in the other position of the switch the end terminal of the transformer secondary is connected through a resistor 26 to the end terminal 20 of the potentiometer. The resistors 25 and 26 together with the condenser 19 function to shift the phase of the voltage applied to the end terminal 20 through 90 degrees at a given frequency so that the signals at the ends of the potentiometer 21 are 90° apart. Assuming that the transformer 14 is designed to operate at both 60 and 400 cycles, the resistor 25 and condenser 19 are selected to produce the desired 90 degree phase shift at 60 cycles while the resistor 26 is selected so that in combination with condenser 19 it will produce a 90 degree phase shift at 400 cycles. In each case the value of the resistance may be calculated by the formula $$R = \frac{1}{2\pi F C}$$

where F is the frequency and C is the capacity of condenser 19.

The end terminal 22 of the potentiometer 21 is connected to a movable contactor 27 of a two position switch 28 so that in one position the contactor 27 is connected through a lead 29 to the terminal 18 of the transformer winding 16 while in the other position it is connected through a lead 30 to the terminal 18a of the transformer winding 16. Thus, with the switch 28 in one position, the phase of the signal appearing at the contactor 21' of the potentiometer 21 as the contactor 21' is moved over the resistance element from one end terminal 20 to the other end terminal 22 will vary from 0 to 90° and with the switch 28 in the other position the phase of the signal appearing at the contactor 21' will vary from 0 to −90°.

The center tap terminal 17 of the transformer secondary 16 is preferably connected to ground and to an output terminal 31 of the phase shifter. The movable contactor 21' of the potentiometer is connected to a third output terminal 32 of the phase shifter and through resistors 33 and 34 to the end terminals 20 and 22, respectively, of the potentiometer 21.

The resistors 33 and 34 produce a non-linear shift in resistance between the end terminals of the potentiometer and the contactor 21' as the latter is displaced. By properly proportioning the values of the potentiometer 21 and resistors 33 and 34 as described in my application S.N. 442,461, filed July 12, 1954, entitled "Tangent Computer Circuit," and assigned to the same assignee as the present application, and now Patent No. 2,948,474, it has been found that the phase of the voltage appearing at the contactor 21' will vary substantially uniformly from 0–90° as the contactor is moved from one potentiometer end terminal to the other. The proper values of each of the resistors 33 and 34 are substantially 1.8 times the total resistance of potentiometer 21 as measured between end terminals 20 and 22.

With the apparatus thus far described, an output or reference signal of constant amplitude and phase is obtained at either 60 or 400 cycles between the output terminals 23 and 31 of the phase shifter. A signal which is variable in phase but approximately constant in amplitude, is obtained between the output terminals 31 and 32 of the phase shifter and the phase of this signal varies linearly with displacement of the contactor 21' over the resistance element of the potentiometer 21. In the normal application of this circuit, the potentiometer 21 may be of conventional construction having a circular resistance element with the contactor 21' carried by a rotatable shaft and riding on the element. In this way a suitable dial may be employed that is calibrated directly in terms of phase shift.

For the purposes of this description a low frequency compensation network has been arbitrarily selected as the network 11. It comprises three independent series connected sections 35, 36, and 37, each consisting of a condenser and variable resistor connected in parallel. For convenience the condensers are denoted by the letter C followed by a numeral, and the resistors by the letter R followed by a numeral.

The entire network is connected through a condenser C1 to the output terminal 23 of the phase shifter, and is terminated by a resistor R1 connected between the output side of the final network section 37 and the ground terminal 31 of the phase shifter. The output terminal 41 of the network which is formed by the juncture of resistor R1 and the network section 37 may be connected to the measuring devices 12 and 13 through an isolation amplifier 42 of the cathode follower type in order to prevent loading of the network by such devices in cases where large resistance values are used and the highest accuracy is required. In such event, the output terminal 41 of the network is connected to one input terminal of the amplifier 42 and the other input terminal of the amplifier is connected to the ground terminal 31 of the phase shifter. In the case of a low impedance network, the amplifier may be unnecessary.

The output of the amplifier 42 is connected through leads 43 and 44 to the Y terminals of the oscilloscope 12 and to the input terminals of the vacuum tube voltmeter 13. The X terminals of the oscilloscope 12 are connected through leads 45 and 46 to the terminals 32 and 31, respectively, of the phase shifter.

With this arrangement and with the selected components in the network 11, as the resistors R1 through R4 are varied, the phase shift produced by the network can be measured by adjusting the contactor 21' of the potentiometer 21 to produce a diagonal line on the oscilloscope. This occurs when the voltages fed to the X and Y terminals are exactly in phase. At the same time the amplitude for each setting can be measured by the vacuum tube voltmeter 13. If desired, the oscilloscope and amplifier may be constructed as a single unit with suitable connections for the attachment of a vacuum tube voltmeter or other suitable voltage measuring means. It is important to note that the resistors R1 to R4 must be varied in a manner directly proportional to frequency in order to obtain the same effect as a linear change in frequency. Then, in accordance with an important aspect of the present invention, by utilizing resistance elements R1 to R4 having a logarithmic taper it is possible to adjust the resistance elements individually corresponding to values used in a particular network to be tested and to still have them vary proportional to F when they are all rotated simultaneously. Moreover it is possible to modify all resistance values simultaneously and in this way greatly expedite the examination of the frequency response to the filter being tested.

For illustrative purposes, the network 11 is shown in FIG. 2 along with design formaulae wherein all components are computed in terms of $\omega_0$ which is equal to $2\pi$ times frequency. From this computation it will be seen that the phase and amplitude response of the network can be determined either by simultaneously varying either the condensers C1 to C4 or the resistors R1 to R4. Since resistance is more easily and inexpensively handled, it is of course preferable to provide means for altering them in order to determine the network characteristics corresponding to a predetermined frequency change. In cases where many network computations are to be checked, it may be desirable to provide in addition to the phase shifter 10 and variable resistances R1 to R4, suitable decade condenser boxes for securing the desired value of condensers C1 to C4 as may be required.

FIG. 3 is a graph showing two separate curves, namely, Gain and Phase Shift obtained from an R–C network tested by varying resistors R1 to R4 in accordance with the invention. The Gain curve is plotted in terms of decibels versus $\omega_0$ while the Phase Shift curve is plotted in degrees versus $\omega_0$. In selecting the condensers for a particular application, it is desirable to choose values so that the mid-frequency operation of the analyzer occurs at the power frequency used. Thus if the analyzer is to be used at 4000 cycles and the resistance values correspond to those at about mid scale on the analyzer, it will be desirable to use about ten times the computed capacity in the analyzer circuit. This will make the midband frequency for the network correspond to the middle of the relative frequency scale on the analyzer and the relative frequency scale can be made to correspond to any frequency.

Figure 4:
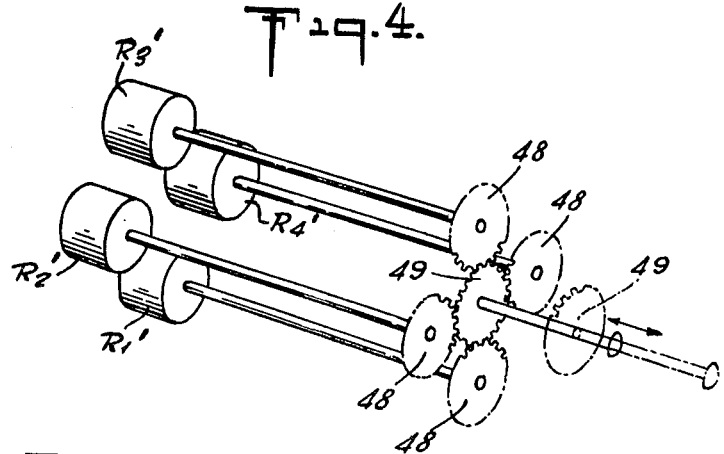
FIG. 4 is a perspective view of one arrangement of the potentiometers of the adjustable impedance circuit in accordance with the present invention which form part of the phase shifting network of FIG. 1.

In accordance with the present invention, an arrangement for adjusting resistors $R_1$ to $R_4$ simultneously is shown in FIG. 4. In this figure, four rotary type potentiometers or step switches $R_1'$ to $R_4'$ are provided and may be mounted on a suitable supporting panel. Each potentiometer or step switch carries a gear 48 secured to its shaft and arranged to mesh directly with a central gear 49. In this way rotation of gear 49 will simultaneously rotate all potentiometers. Since the absolute values of the several resistors in each network will normally be different, independent operation of each potentiometer or switch is provided. To attain this end, the gear 49 is preferably mounted for displacement outwardly from the plane of gears 48 to free the potentiometers or switches and permit each one to be moved independently of the others.

It will be observed that through the use of resistors having logarithm tapers, individual adjustment of the resistors for a particular network can be accomplished and at the same time have them vary proportional to frequency when actuated simultaneously. The use of the logarithm taper applies equally to both potentiometers as well as step switches of the type illustrated in the drawings.

Figure 5:
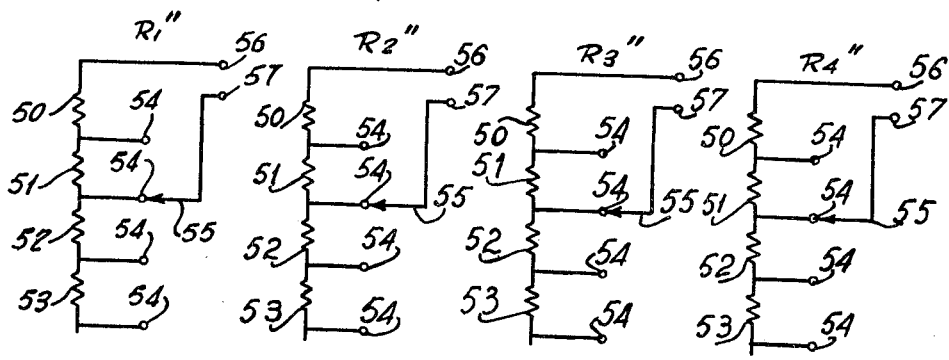
FIG. 5 is a circuit diagram of the several potentiometers of FIG. 4.

As an example of one form of variable resistance that may be used in attaining the objects of this invention, reference is made to FIG. 5 showing diagrammatically step switches $R_1''$–$R_4''$ which corresponds to $R_1$–$R_4$ respectively. Each step switch has a plurality of fixed contacts 54, a movable contacting arm 55 cooperating with the contacts 54 and a plurality of resistors 50 to 53 connected in series between the end contacts 54 and 56. The output terminals 56 and 57 of each switch are connected with one end of resistor 50 and the arm 55 respectively. By coupling each arm 55 to its associated gear 48, all arms can be moved individually or collectively as may be desired. The values of the individual resistors 50, 51, etc. are preferably chosen so that movement of the contactor 55 from one terminal to the next will increase the resistance of the unit 1.41 times or the equivalent of one-half octave in frequency. This figure may of course be modified to obtain smaller or larger frequency steps depending upon the requirements of the specific application. While only four resistors are illustrated in FIG. 5 as being incorporated in each of the switches $R_1''$ to $R_4''$, it will be understood that any number of resistors may be provided to meet the requirements of a given situation and similarly, any number of switches may be utilized and arranged for simultaneous operation. When the switches such as $R_1''$ to $R_4''$ are gear driven in accordance with FIG. 4, the gears 48 and 49 should have a number of teeth corresponding to an integral multiple of the number of steps on the switches in the resistances in order to maintain synchronism between the several switches.

Figure 6:
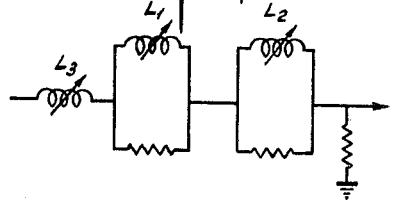
FIGS. 6 and 7 illustrate further embodiments of the invention.
Figure 7:
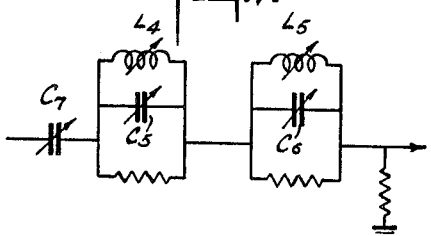

Though it is desirable in most applications to provide for variation of the resistance elements, it is of course possible to obtain similar results by varying C1 to C4. It is clear, however, that the change in frequency will be inversely proportional to the capacity and the indicating scales must of course be arranged accordingly. Another variation of the invention is shown in FIG. 6 wherein the network includes inductances L1, L2 and L3 which when varied simultaneously will produce a change directly proportional to frequency. FIG. 7 is still another modification of the invention utilizing resistance, inductance and capacity. In this case it would be preferable to simultaneously modify both the inductances L4 and L5 as well as the condenser C5, C6 and C7.

From the above it is apparent that the principles of this invention may be applied to the design and testing of all types networks, as for instance band pass and high pass filters. It is also apparent that many modifications or changes may be made without departing from the spirit or scope of the invention.

What is claimed is:

1. In an apparatus for network analysis, the combination comprising:
 (a) a plurality of variable impedance elements, each of said variable impedance elements having first and second terminals adapted to be coupled to other impedance devices for forming a frequency-responsive network, each of said variable impedance elements including a shaft means for varying the impedance between said first and second terminals, the impedance between said first and second terminals of each of said variable impedance elements varying from a first impedance value to a second impedance value according to the exponential function of the angular position of its associated shaft means,
 (b) a plurality of adjusting means mechanically coupled, respectively, to each shaft means of said plurality of variable impedance elements,
 (c) shaft positioning means having an engaging and a disengaging position, and
 (d) means mechanically coupled to said shaft positioning means, said means mechanically coupling said shaft positioning means to said plurality of adjusting means when said shaft positioning means is in the engaging position for simultaneously adjusting the angular position of all of the shaft means of said plurality of variable impedance elements, each of said plurality of adjusting means independently adjusting the angular position of its associated shaft means of said plurality of variable impedance elements when said shaft positioning means is in the disengaging position.

2. The combination as defined by claim 1 when said plurality of variable impedance elements is a plurality of variable resistor elements.

3. The combination as defined by claim 2 wherein each of said variable resistor elements comprises a group of resistors, each group including a plurality of individual resistors connected in series with each other, a pair of end contacts coupled, respectively, to each end of said group of series-coupled resistors, a contact coupled to each junction between the resistors of said group, a movable contact adapted to be coupled, successively, to each of said contacts, said movable contact being mechanically coupled to said shaft means and electrically coupled to said first terminal, one of said pair of end contacts coupled to said second terminal.

4. Apparatus for network analysis comprising in combination:
 (a) a plurality of variable resistor elements, each of said variable resistor elements having first and second terminals adapted to be coupled to reactive devices for forming a frequency-responsive network, each of said variable resistor elements including a shaft means for varying the resistance between said first and second terminals, the resistance between said first and second terminals of each of said variable resistor elements varying from a first resistance value to a second resistance value such that the logarithm of the ratio of said first and second resistance values is directly proportional to the angular position of its associated shaft means, (b) a plurality of adjusting means mechanically coupled, respectively, to each shaft means of said plurality of variable resistor elements,
(c) shaft positioning means having an engaging and a disengaging portion, and
(d) means mechanically coupled to said shaft positioning means, said means mechanically coupling said shaft positioning means to said plurality of adjusting means when said shaft positioning means is in the engaging position for simultaneously adjusting the angular position of all of the shaft means of said plurality of variable resistor elements, each of said plurality of adjusting means independently adjusting the angular position of its associated shaft means of said plurality of variable resistor elements when said shaft positioning means is in the disengaging position.

References Cited by the Examiner

UNITED STATES PATENTS

| | | | |
|---|---|---|---|
| 1,194,451 | 8/16 | Wiegand | 338—131 |
| 2,184,104 | 12/39 | Smith | 323—79 |
| 2,349,240 | 5/44 | Aiman | 74—665 |
| 2,423,463 | 7/47 | Moore | 338—89 |
| 2,578,235 | 12/51 | Few | 323—126 |
| 2,586,803 | 2/52 | Fleming | 323—122 |
| 2,680,177 | 6/54 | Rosenthal | 338—89 |
| 2,799,821 | 7/57 | Hannig et al. | 323—74 X |
| 2,947,934 | 8/60 | Bolie | 323—74 |

LLOYD McCOLLUM, *Primary Examiner.*

MILTON O. HIRSHFIELD, *Examiner.*